United States Patent
Birnkrant

[15] 3,707,290
[45] Dec. 26, 1972

[54] ANSWER BOARD WITH MAGNETICALLY INFLUENCED POINTER

[72] Inventor: Melvyn Birnkrant, Beacon, N.Y.
[73] Assignee: Colorforms, Norwood, N.J.
[22] Filed: June 10, 1971
[21] Appl. No.: 151,833

[52] U.S. Cl.................273/141 A, 46/239, 273/161
[51] Int. Cl............................A63f 9/18, A63h 33/26
[58] Field of Search......273/1 M, 161, 138 A, 141 A; 46/238, 239, 242

[56] References Cited

UNITED STATES PATENTS

| | | | |
|---|---|---|---|
| 2,220,049 | 10/1940 | Dunmore | 46/239 X |
| 3,425,157 | 2/1969 | Hartsock | 46/238 |
| 3,478,466 | 11/1969 | Conner | 273/1 M X |
| 3,307,850 | 3/1967 | Thomas | 273/161 |
| 1,481,256 | 1/1924 | Dols | 46/238 |

Primary Examiner—Anton O. Oechsle
Attorney—Ostrolenk, Faber, Gerb & Soffen

[57] ABSTRACT

An amusement device is constructed with a pointer suspended above an answer board. The pointer is secured to the lower end of a flexible filament whose upper end is supported at a vertical axis passing through the center of the answer board. A disc-like permanent magnet positioned immediately below the answer board cooperates with a permanent magnet mounted to the pointer, in that the flux fields of the magnets interact, so that the pointer is repelled thereby being directed toward the periphery of the answer board. The edges of the disc magnet are notched so that the flux lines are not uniformly distributed and because of this free swing of the pointer is broken as it seeks to find an equilibrium position, and pointer motion is erratic so that the pointer appears to jump.

7 Claims, 7 Drawing Figures

PATENTED DEC 26 1972 3,707,290
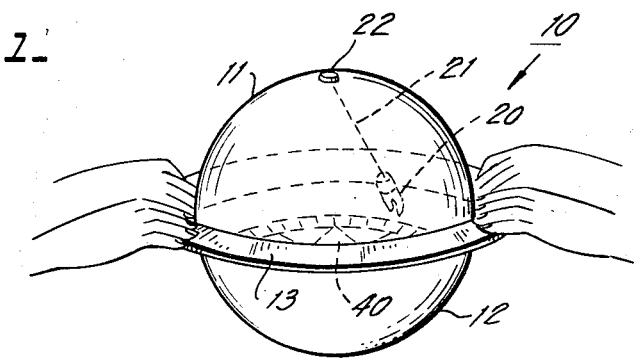
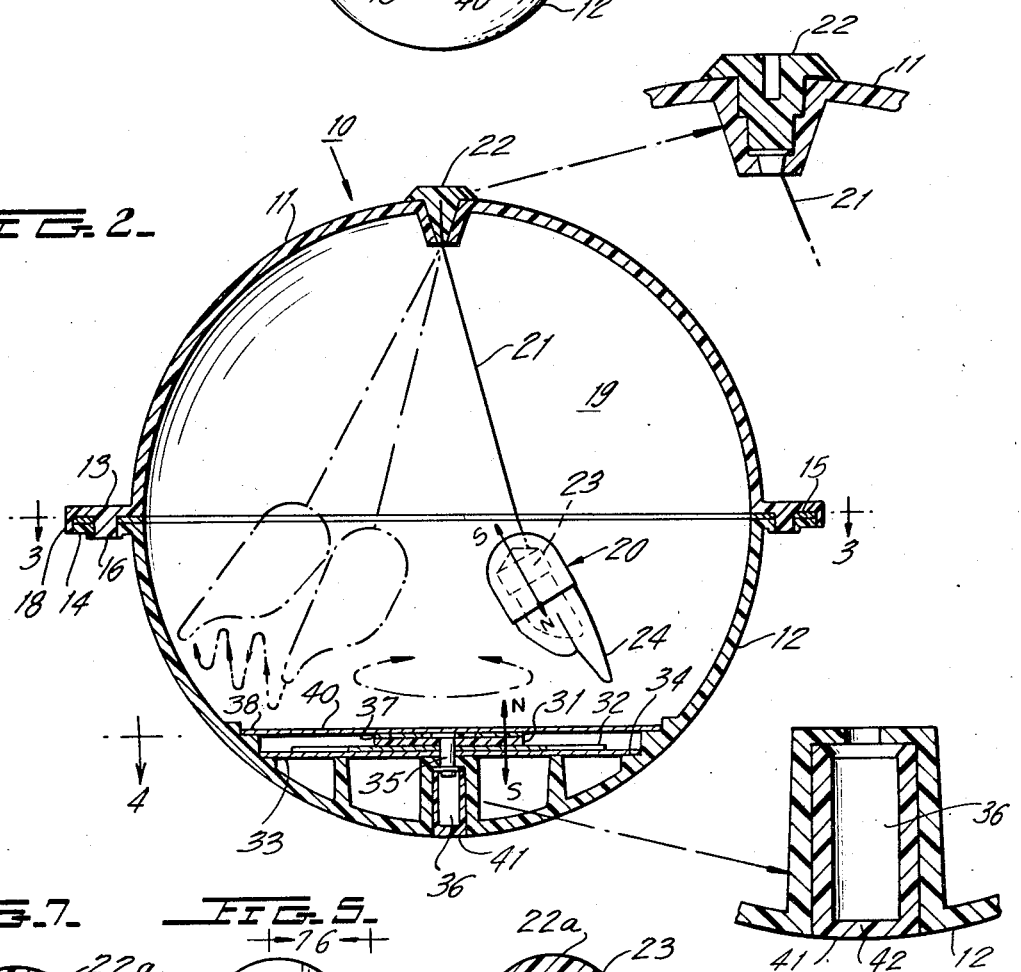
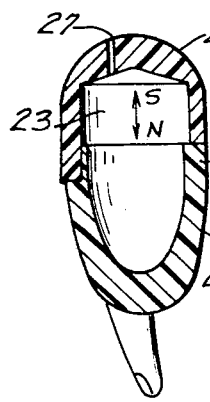
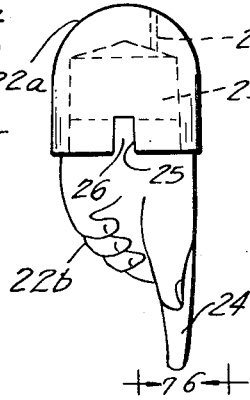
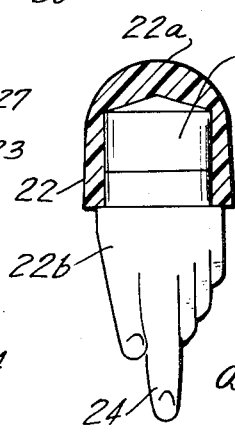
INVENTOR.
MELVYN BIRNKRANT
BY
Ostrolenk, Faber, Gerb & Soffen
ATTORNEYS INVENTOR.
MELVYN BIRNKRANT
BY
Ostrolenk, Faber, Gerb & Soffen
ATTORNEYS

ANSWER BOARD WITH MAGNETICALLY INFLUENCED POINTER

The instant invention relates to amusement devices and more particularly relates to the positioning of a pointer means through the interaction of opposing magnetic fields.

For the most part, prior art amusement devices having a pointer for the random selection of numbers or other answers and directions have been of the spinner type, in which the pointer is mounted for rotation about an axis extending through the center of the pointer and perpendicular to the plane of movement thereof. Rotation of prior art pointers was usually obtained by the direct application of physical energy with motion of the pointer being in a regular path.

In the device of the instant invention the repelling force between two permanent magnet fields is utilized to impart motion to a pointer until the latter reaches an equilibrium position wherein the weight of the pointer is counterbalanced by the repelling forces acting between the magnetic fields. The structure is so arranged that the pointer is driven toward the periphery of a circular answer board, and held thereabove in spaced relation. The stationary permanent magnet field is provided with irregularities so that the pointer motion is erratic and the pointer jumps as it seeks its equilibrium position. The sum total of pointer motion results in unpredictability and an appearance that is "unreal."

Accordingly, a primary object of the instant invention is to provide a novel construction for an amusement device having a pointer and an answer board.

Another object is to provide an amusement device of this type in which forces of opposing magnetic fields are utilized to impart motion to a pointer and then support the pointer in a position of equilibrium.

Still another object is to provide an amusement device of this type in which there is an irregularly shaped stationary magnetic field which results in compound or erratic motion of a pointer.

These objects as well as other objects of this invention will become readily apparent after reading the following description of the accompanying drawings in which:

FIG. 1 is a perspective of an amusement device constructed in accordance with teachings of the instant invention.

FIG. 2 is a vertical cross-section of the amusement device of FIG. 1.

FIG. 5 is a front elevation of the pointer.

FIG. 6 is a rear elevation of the pointer looking in the direction of arrows 6—6 of FIG. 5, with the cap portion sectioned.

FIG. 7 is a cross-section taken through line 7—7 of FIG. 5 looking in the direction of arrows 7—7.

Figure 3:
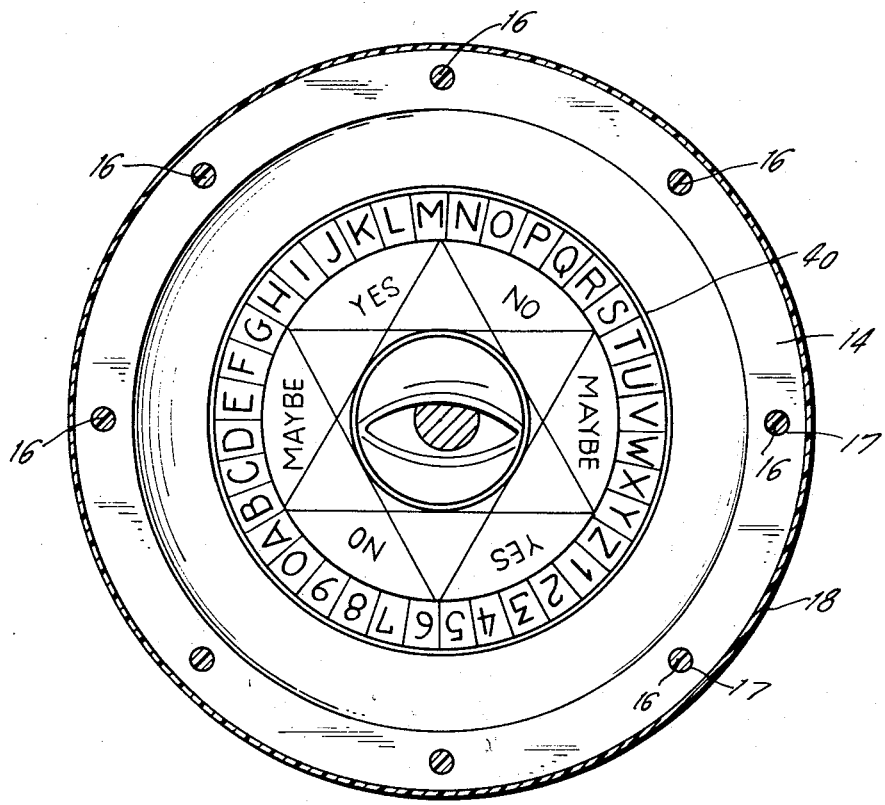
FIG. 3 is a plan view of the lower housing section looking in the direction of arrows 3—3 of FIG. 2.
Figure 4:
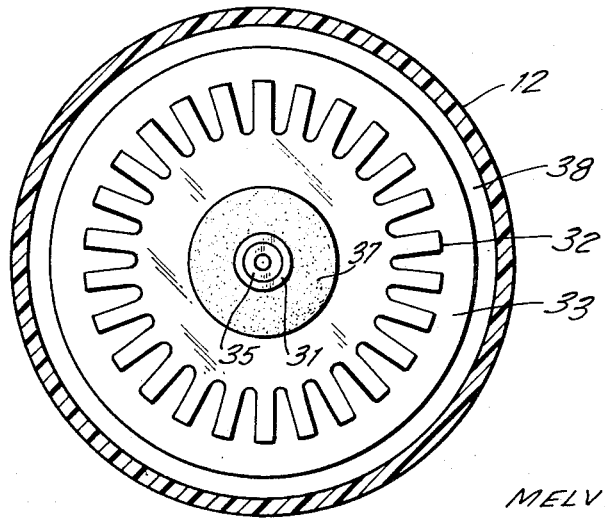
FIG. 4 is a cross-section taken through line 4—4 of FIG. 2.

Now referring to the figures. The amusement device indicated generally by reference numeral 10 in FIGS. 1 and 2 includes a housing constructed of mating transparent hemispheres 11, 12 having an outwardly extending equatorial ring formed by lips 13, 14. Paper ring 15, having decorative markings (not shown), is interposed between lips 13, 14. Projections 16 extend downward from upper lip 13 into apertures 17 in lower lip 14 to accurately align hemispheres 11, 12. Cement applied to downwardly extending rim 18 along the free edge of lip 13 fixedly secures the spherical halves 11, 12 together to form chamber 19 wherein pointer 20 is confined.

The upper end of support arm thread 21 is clamped between plug 22. Plug 22 is force fitted into a double-stepped recess at the top of housing part 11. Similarly, pointer 20 is secured to the lower end of support arm 21 by having the latter clamped between the mating parts 22a, 22b forming pointer 20. Support arm 21 is constructed of a thin flexible filament, preferably clear nylon.

As best seen in FIGS. 5–7, pointer 20 includes hand-like hollow lower portion 21b having downwardly extending index finger 24, and hollow cap 22a which closes the open upper end of portion 22b. Disposed within cap 22a is squat cylindrically shaped permanent magnet 23 which rests against the upper end of lower portion 22b. The lower edge of cap 22a is provided with keying notch 25 which receives projection 26 from lower member 22b to properly orient cap aperture 27 through which the lower end of filament 21 extends. The off-center position securement of filament 21 to cap 22 is chosen so that with pointer 20 in the equilibrium position of FIG. 2, index finger 24 extends essentially parallel to filament 21.

Movable magnet 23 is oriented in repelling relationship with respect to the stationary magnet means consisting of thin disc permanent magnet 31 seated on top of spoked steel disc 32. The latter is seated on cardboard disc 33 whose periphery is supported on internal ledge 34 of lower housing part 12. Brass eyelet 35 extends into central recess 36 at the bottom of lower housing part 12 and through central apertures in elements 31–33, to fixedly secure these elements to lower housing part 12. Cardboard spacer disc 37 is cemented to the upper surface of permanent magnet 31, and answer board 40 is cemented to the upper surface of disc 30. The periphery of answer board 40 is supported on internal ledge 38 of lower housing part 12.

The repelling action of the flux fields generated by permanent magnets 23 and 31 maintains pointer 20 suspended above answer board 40 and forced toward the periphery of stationary magnet means 31, 32. The notches in the periphery of magnetic disc 32 cause irregularities in the stationary flux field so that as pointer 20 seeks an equilibrium position the latter moves erratically and appears to jump rather than move smoothly in a free swing.

In one form of use for amusement device 10 the unit is placed on a horizontal surface in the orientation of FIGS. 1 and 2. Two players face each other and rest their fingertips on the ring formed by lips 13, 14. A question requiring a simple Yes–No answer or requiring a number or letter answer is asked. Device 10 is then tilted and restored to its upright position wherein plug 22 is located on a vertical axis extending perpendicular to and through the center of answer board 40. Due to the interaction of the magnetic fields generated by permanent magnets 23 and 31, pointer 20 must move in a generally circular path with the tip of index finger 24 positioned above the periphery of spoked magnetic element 32. At the same time the irregularities in the stationary magnetic field will cause finger 24 to move erratically rather than swing freely. The number of notches in element 32 may be related in a predetermined manner to the numbers and letters on answer board 40. When pointer 20 reaches an equilibrium or at-rest position within the composite field generated by permanent magnets 23 and 31, index finger 24 will point to the answer on board 40. Plug 42, force fitted into lower housing recess 36, is provided with lower spherical surface 41 which appears as a continuation of the spherical outer surface of lower housing part 12 so that device 10 will not naturally assume a level position wherein lips 13, 14 are horizontal.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows.

1. A game device including an answer board, a pointer means, an arm connected to said pointer means at one end thereof to support said pointer means above said board, support means including means holding said arm at the other end thereof for pivotal movement of the latter; plate-like first means at said board interacting with second means carried by said pointer to position the latter above said board and spaced therefrom with said arm being on an incline when said board is substantially horizontal and said arm being free to rotate about an axis which extends vertically and through said other end of said arm; said first and second means being permanent magnets arranged so that the magnetic fluxes generated thereby interact to cause the magnets to repel each other, with the permanent magnet of said first means being magnetized perpendicular to the plane of the first means and the permanent magnet of said second means being magnetized generally parallel to the direction in which the pointer means points; said first means having a circular edge with peripheral notches therein whereby said pointer means in seeking a position of rest moves through a magnetic field with relatively abrupt variations therein whereby motion of said arm is erratic in that motion is about said axis as well as toward said axis and away therefrom.

2. A game device as set forth in claim 1 in which the support means also includes a transparent dome over said board, said means holding said arm being at the top of said dome.

3. A game device as set forth in claim 1 in which the arm is a flexible filament.

4. A game device as set forth in claim 3 in which the filament is substantially transparent.

5. A game device as set forth in claim 3 in which the pointer is in the shape of a hand having a downwardly extending finger; said filament being secured to said pointer in an off-center position located so that said finger extends essentially parallel to said filament.

6. A game device as set forth in claim 1 in which the pointer is in the shape of a hand having a downwardly extending finger.

7. A game device as set forth in claim 1, in which the repelling action between said magnets in combination with the weight of said pointer and mounting thereof positions the lower end of said pointer outboard of said circular edge.

* * * * *